United States Patent [19]

Breher

[11] Patent Number: 5,013,286
[45] Date of Patent: May 7, 1991

[54] BELT DRIVE COMPRISING A TOOTHED BELT AND A TOOTHED PULLEY

[75] Inventor: Rudolf Breher, Porta Westfalica, Fed. Rep. of Germany

[73] Assignee: Breco Kunststoffverarbeitungs-GmbH & Co. KG, Porta Westfalica, Fed. Rep. of Germany

[21] Appl. No.: 494,134

[22] Filed: Mar. 14, 1990

[30] Foreign Application Priority Data

Mar. 25, 1989 [DE] Fed. Rep. of Germany ....... 3909949

[51] Int. Cl.$^5$ ................................................. F16G 1/00
[52] U.S. Cl. ..................................... 474/205; 474/153; 474/161
[58] Field of Search ............... 474/153, 161, 204, 205, 474/249-252

[56] References Cited

U.S. PATENT DOCUMENTS

| | | |
|---|---|---|
| 975,938 | 11/1910 | Downey ............................ 474/161 |
| 2,770,977 | 11/1956 | Beckadolph et al. . |
| 3,052,133 | 9/1962 | Bradley ........................... 474/161 X |

FOREIGN PATENT DOCUMENTS

| | | |
|---|---|---|
| 2404780 | 6/1979 | France ............................. 474/161 X |
| 8203257 | 11/1983 | Japan .................................... 474/161 |
| 719694 | 12/1954 | United Kingdom ................ 474/161 |

*Primary Examiner*—Thuy M. Bui
*Attorney, Agent, or Firm*—Robert W. Becker & Associates

[57] ABSTRACT

A belt drive comprising a toothed belt and a toothed pulley. The belt is provided with a guide rib that extends in the longitudinal direction of the belt and traverses the teeth thereof. To provide lateral guidance of the belt on a toothed pulley, the guide rib engages an annular groove on the periphery of the pulley. Disposed on the base of the annular groove of the pulley is an insert that is made of a material that has a softer resilience than does the material of the belt. The radial height of the insert is such that when the toothed belt runs up onto the toothed pulley, the guide rib of the belt first contacts the soft-elastic insert, and only after radial compression of the insert do the belt teeth rest upon the corresponding surfaces of the toothed pulley.

7 Claims, 1 Drawing Sheet

BELT DRIVE COMPRISING A TOOTHED BELT AND A TOOTHED PULLEY

BACKGROUND OF THE INVENTION

The present invention relates to a belt drive comprising a toothed belt and a toothed pulley, with the toothed belt, which is made of plastic or some other extrudable material, containing an inextensible reinforcing insert that is embedded in the belt body thereof and also being provided with guide rib means that extends in a longitudinal direction of the toothed belt and traverses ribs of the belt, with the guide rib means, during rotation of the toothed belt about the toothed pulley, engaging in annular groove-like recess means disposed on the periphery of the toothed pulley, and with the guide rib means, to increase their flexibility, being provided with notches in the vicinity of grooves of the toothed belt.

Normally, as toothed belts rotate about a toothed pulley, they are guided on the sides between two lateral flanges of the toothed pulley. However, there are also toothed belt drives, for example where the belt is used as a transport member in conveying units, where flanges of a toothed pulley cannot project laterally beyond the toothed belt. For this purpose, see for example U.S. Pat. No. 2,770,977, a self-guiding toothed belt is known that is provided on its toothed side with one or more strip-like guide ribs that extend in the longitudinal direction of the belt; these guide ribs engage in conforming annular grooves on the toothed peripheral surface of the toothed pulley in order thereby to laterally guide the toothed belt even where the toothed pulley has no flanges. Unfortunately, due to the presence of the strip-like guide ribs, the force-transfer surface at the sides of the toothed ribs is reduced, so that in order to be able to transfer the same drive power as in the case without the guide ribs, the toothed belt has to be wider. However, this also increases the noise made by the belt as it rotates about the toothed pulley.

Starting from the aforementioned toothed belt construction having a guide rib for self-guidance on a toothed pulley that has no flange, it is an object of the present invention to provide for a quieter operation of the toothed belt about the toothed pulley.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The belt drive of the present invention is characterized primarily in that the groove-like recess means of the toothed pulley has a base on which is disposed insert means made of a material that has a softer resilience than does the material of the toothed belt, with the insert means having a height, prior to the time that the toothed belt runs up onto the toothed pulley, that is a predetermined amount greater than the distance between the base of the groove-like recess means and a head surface of the guide rib means when the same engages the recess means.

The insert can be made, for example, of a plastic having a hardness of 40 to 65 Shore A, which is softer and more resilient than, for example, the plastic polyurethane that is often used for toothed belts and is particularly suitable therefor. When the toothed belt runs up onto the toothed pulley, the guide rib of the toothed belt first comes into contact with the resilient insert in the annular groove of the toothed pulley, so that the head surfaces of the belt teeth and the bases of the pulley grooves, and the head surfaces of the pulley teeth and the bases of the belt grooves, do not strike against one another with an increased generation of noise; rather, contact is not made until the insert has first been radially and resiliently compressed, thereby damping this contact and providing a quiet operation.

Further specific features of the present invention will be described in detail subsequently.

DESCRIPTION OF PREFERRED EMBODIMENTS

Figure 1:
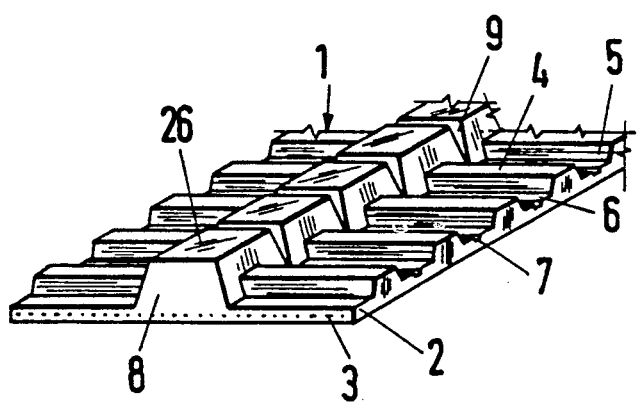
FIG. 1 shows a first exemplary embodiment of the inventive configuration of the toothed belt of the belt drive.

Referring now to the drawing in detail, the toothed belt 1 illustrated in FIG. 1 is made of plastic or a similar extrudable material, and is provided with a toothed belt side that comprises the tooth ribs 4 and the tooth grooves 5. In addition, the toothed belt 1 contains an inextensible reinforcing insert 3 that is embedded in the belt body 2. On the toothed side, the belt 1 is provided with a guide rib 8 along a line that extends along the center of the belt. This guide rib 8 is formed along with the belt in a belt-manufacturing apparatus from the same material; in other words, the rib 8 is a component of the toothed belt 1 that is injected or extruded directly onto the belt body 2 during the manufacture of the belt. At those locations disposed laterally adjacent the tooth grooves 5, the guide rib 8 is provided with notches 9 that extend to the reinforcing insert 3, which is disposed below the base 6 of the grooves 5. As a result, via the narrow, rib-like, roll-type projections of the manufacturing apparatus, for example that disclosed in German Pat. 2123902, an important support of the reinforcing insert in the neutral bending plane of the toothed belt 1 can be undertaken not only at the narrow, groove-like recesses 7 on the bases 6, but also in the region of the guide ribs 8 via the notches 9 thereof.

Figure 2:
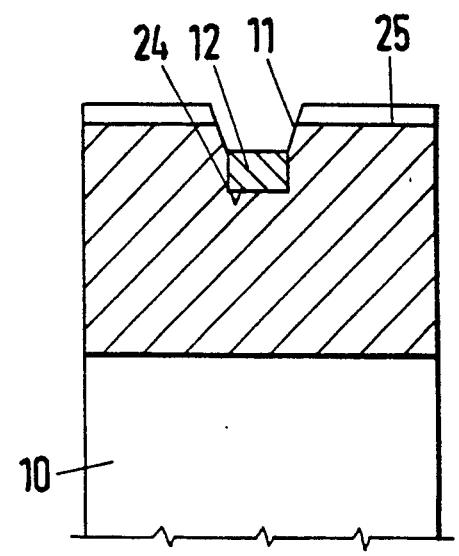
FIG. 2 shows one advantageous exemplary embodiment of a toothed pulley of the belt drive that conforms to the toothed belt of FIG. 1.

As illustrated in FIG. 2, the toothed pulley 10 of the belt drive is provided with a central annular groove 11 that corresponds to the guide rib 8 of the toothed belt 1. To prevent the toothed belt 1 from laterally leaving the toothed pulley 10, the guide rib 8 engages the annular groove 11. Disposed on the base 24 of the annular groove 11 is an insert 12 that is made of an elastic or resilient material, for example a resilient plastic, which is softer than the material from which the toothed belt 1, including the integrally formed-on guide rib 8 thereof, is normally made, such as polyurethane. A soft material having a hardness of from 40 to 65 Shore A is preferably used for the insert 12. Prior to the time that the toothed belt 1 runs up onto the toothed pulley 10, the insert 12 has a height that is a predetermined amount greater than the distance between the base 24 of the annular groove 11 and the head surface 26 of the guide rib 8 that has entered or engaged the annular groove 11. Consequently, the guide rib 8 of the toothed belt 1 first runs up upon the soft-resilient insert 12, as a result of which the otherwise driving contact of the teeth and grooves of the toothed belt and toothed pulley is damped and a very quiet running of the toothed belt on the toothed pulley is effected. In the embodiment illustrated in FIGS. 1 and 2, the height of the guide rib 8 of the toothed belt 1 is greater than the height of the tooth ribs 4 thereof, and the base 24 of the annular groove 11 of the toothed pulley 10 is deeper than the base 25 of the tooth grooves thereof. This has the advantage that also in the region of the tooth grooves of the toothed pulley 10, at least a portion of the radial height of the insert 12 is recessed in an annular groove-like recess of the toothed pulley, and is therefore supported toward the sides. The height of the guide rib 8 of the toothed belt 1 and the depth of the annular groove 11 of the toothed pulley 10 are advantageously such that the entire height of the insert 12, in its non radially compressed state, is disposed below the base 25 of the tooth grooves of the toothed pulley 10, so that also in the radially compressed state, the insert 12 cannot be pressed sideways into the tooth grooves of the toothed pulley 10.

Figure 3:
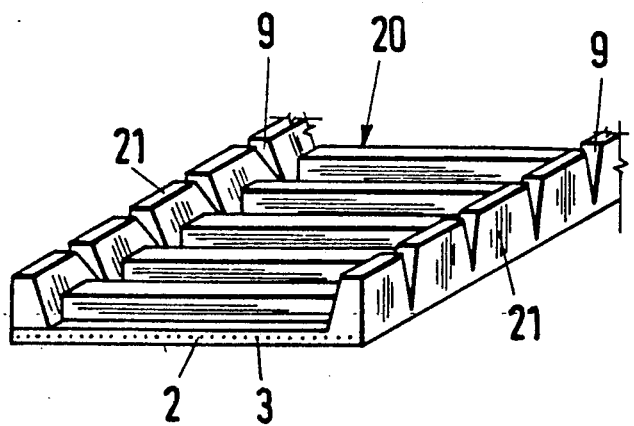
FIG. 3 shows a second exemplary embodiment of the inventive toothed belt of the belt drive.
Figure 4:
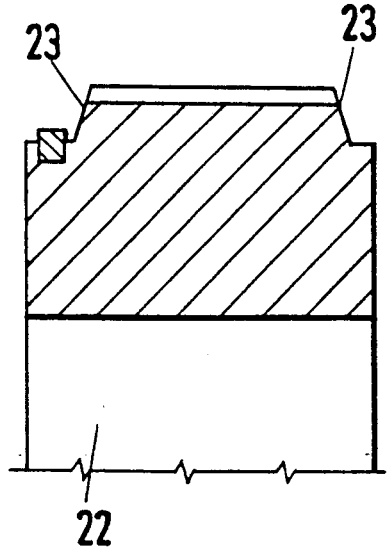
FIG. 4 shows an exemplary embodiment of the toothed pulley that conforms to the toothed belt of FIG. 3.

In the embodiment of the belt drive illustrated in FIGS. 3 and 4, both of the edges of the toothed belt 20 are respectively provided with a guide rib 21 that has the notches 9. By means of these guide ribs 21, the sides of the toothed belt 20 rest against lateral annular surfaces 23 of the toothed pulley 22. The annular surfaces 23 are recessed relative to the outer surfaces of the toothed pulley 22, and thereby form on the periphery of the toothed belt annular recesses for accommodating the guide ribs 21, so that the two lateral guide ribs 21 of the toothed belt 20 do not project beyond the outer surfaces of the toothed pulley 22. As indicated on the left side of FIG. 4, disposed on the radial base of the annular recess is a soft-resilient insert that corresponds to the insert 12 of FIG. 2. This insert can also be disposed in the same manner in the other annular recess so that both of the lateral guide ribs 21 of the toothed belt 20 can run up on the toothed pulley 22 in a damped and quiet manner.

The present invention is, of course, in no way restricted to the specific disclosure of the specification and drawing, but also encompasses any modifications within the scope of the appended claims.

What I claim is:

1. In a belt drive comprising a toothed belt and a toothed pulley, with said toothed belt containing an inextensible reinforcing insert that is embedded in the belt body thereof and also being provided with guide rib means that extends in a longitudinal direction of said belt and traverse teeth of said belt, with said guide rib means, during rotation of said belt about said toothed pulley, engaging in an annular recess means disposed on the periphery of said pulley, and with said guide rib means, to increase the flexibility thereof, being provided with notches in the vicinity of grooves of said belt between said teeth thereof, the improvement wherein:
said annular recess means of said toothed pulley has a base on which is disposed an annular insert means made of a material that has a softer resilience than does the material of said toothed belt, with said insert means having a height, prior to the time that said belt runs up onto said pulley, that is a predetermined amount greater than the distance between said base of said annular recess means and a head surface of said guide rib means when the same engages said annular recess means.

2. A belt drive according to claim 1, in which said guide rib means has a height that is greater than a height of said teeth of said belt; and in which said base of said annular recess means is lower than a base of grooves between teeth of said pulley.

3. A belt drive according to claim 1, in which said guide rib means of said toothed belt is a single guide rib that is centrally disposed between longitudinal side edges of said belt; and in which said annular recess means of said toothed pulley is a single central annular groove on the base of which is disposed said insert means.

4. A belt drive according to claim 3, in which the height of said guide rib and the depth of said annular groove are such that in a non radially compressed state, the entire height of said insert means is disposed below bases of grooves between teeth of said pulley.

5. A belt drive according to claim 1, in which said guide rib means of said toothed belt comprises two guide ribs, one along each longitudinal side edge of said belt; and in which said annular recess means comprises two annular recesses, one along each longitudinal peripheral edge of said pulley, with a respective insert means being disposed on a base of each annular recess, which furthermore has an annular lateral surface for guiding a respective one of said guide ribs.

6. A belt drive according to claim 5, in which the height of said guide ribs and the depth of said annular recesses are such that in a non radially compressed state, the entire height of said insert means is disposed below bases of grooves between teeth of said pulley.

7. In a belt drive comprising a toothed belt and a toothed belt pulley, with said toothed belt containing an inextensible reinforcing insert that is embedded in the belt body thereof and also being provided with guide rib means that extends in a longitudinal direction of said belt and traverses teeth of said belt, with said guide rib means, during rotation of said belt about said toothed pulley, engaging in an annular recess means disposed on the periphery of said pulley, and with said guide rib means, to increase the flexibility thereof, being provided with notches in the vicinity of grooves of said belt between said teeth thereof, the improvement wherein:
said annular recess means of said toothed pulley has a base on which is disposed an annular insert means made of a material that has a softer resilience than does the material of said toothed belt, with said insert means having a height, prior to the time that said belt runs up onto said pulley, that is a predetermined amount greater than the distance between said base of said annular recess means and a head surface of said guide rib means when the same engages said annular recess means, and with said guide rib means having a height that is greater than a height of said teeth of said belt, and said base of said annular recess means being lower than a base of grooves between teeth of said pulley, whereby the height of said guide rib means and the depth of said annular recess means are such that in a non radially compressed state, the entire height of said insert means is disposed below said bases of said grooves between said teeth of said pulley.

* * * * *